(12) United States Patent
Tang et al.

(10) Patent No.: US 10,732,489 B2
(45) Date of Patent: Aug. 4, 2020

(54) TELESCOPIC LIMITING STRUCTURE, CAMERA BODY AND CAMERA

(71) Applicant: SZ DJI TECHNOLOGY CO., LTD., Shenzhen (CN)

(72) Inventors: Yin Tang, Shenzhen (CN); Feihu Yang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/560,207

(22) Filed: Sep. 4, 2019

(65) Prior Publication Data

US 2019/0391466 A1 Dec. 26, 2019

Related U.S. Application Data

(63) Continuation of application No. 15/991,663, filed on May 29, 2018, now Pat. No. 10,416,536, which is a
(Continued)

(51) Int. Cl.
*G03B 17/14* (2006.01)
*G03B 17/56* (2006.01)

(52) U.S. Cl.
CPC .......... *G03B 17/14* (2013.01); *G03B 17/566* (2013.01)

(58) Field of Classification Search
None
See application file for complete search history.

(56) References Cited

U.S. PATENT DOCUMENTS

| | | | |
|---|---|---|---|
| 4,860,043 A | 8/1989 | Kurei | |
| 5,718,439 A * | 2/1998 | Wang | B62B 7/142 280/47.38 |

(Continued)

FOREIGN PATENT DOCUMENTS

| | | |
|---|---|---|
| CN | 102653095 A | 9/2012 |
| CN | 102890392 A | 1/2013 |

(Continued)

OTHER PUBLICATIONS

The World Intellectual Property Organization (WIPO) International Search Report for PCT/CN2014/089215 dated Jul. 17, 2015 6 pages.

*Primary Examiner* — William B Perkey
(74) *Attorney, Agent, or Firm* — Anova Law Group, PLLC (57) ABSTRACT

A telescopic limiting structure includes a first retractable member and a second retractable member. The first retractable member includes a first inclined face and is configured to move along a first direction. The second retractable member includes a second inclined face bearing against the first inclined face. The first inclined face and the second inclined face are configured to drive the second retractable member to move along a second direction in response to the first retractable member moving along the first direction. The second direction is different from the first direction. The first retractable member includes a first elastic element configured to extend and retract along the first direction, the second retractable member includes a second elastic element configured to extend and retract along the second direction, and in a process of compressing the first elastic element, the second elastic element moves closer to the first retractable member in the second direction.

20 Claims, 6 Drawing Sheets

Related U.S. Application Data continuation of application No. 15/485,416, filed on Apr. 12, 2017, now Pat. No. 9,995,992, which is a continuation of application No. PCT/CN2014/089215, filed on Oct. 22, 2014.

(56) References Cited

U.S. PATENT DOCUMENTS

| | | | |
|---|---|---|---|
| 5,897,229 | A | 4/1999 | Kawakami |
| 7,645,080 | B2 | 1/2010 | Toji |
| 9,170,604 | B2 * | 10/2015 | Guo .................. G06F 3/0202 |
| 9,995,992 | B2 * | 6/2018 | Tang .................. G03B 17/14 |
| 10,416,536 | B2 * | 9/2019 | Tang .................. G03B 17/566 |
| 10,437,135 | B2 * | 10/2019 | Yang .................. G03B 17/14 |
| 2002/0026696 | A1 | 3/2002 | Takeda |
| 2004/0141738 | A1 | 7/2004 | Kawazura |
| 2006/0228110 | A1 | 10/2006 | Senba |
| 2009/0316037 | A1 | 12/2009 | Tomatsu et al. |
| 2010/0008096 | A1 * | 1/2010 | Ling .................. F21V 21/04 362/427 |
| 2011/0222215 | A1 * | 9/2011 | Wu .................. H05K 5/0013 361/679.01 |
| 2012/0261937 | A1 * | 10/2012 | Buchheit .................. E05B 63/242 296/37.12 |
| 2013/0021686 | A1 | 1/2013 | Uehara |
| 2017/0219916 | A1 | 8/2017 | Tang et al. |
| 2017/0227833 | A1 | 8/2017 | Yang et al. |
| 2018/0373124 | A1 | 12/2018 | Yang et al. |

FOREIGN PATENT DOCUMENTS

| | | |
|---|---|---|
| CN | 203837055 U | 9/2014 |
| CN | 204143143 U | 2/2015 |
| JP | S3603149 Y | 2/1961 |
| JP | S5243425 U | 9/1975 |
| JP | S6078175 U | 5/1985 |
| JP | S60201328 A | 10/1985 |
| JP | 2008083377 A | 4/2008 |

* cited by examiner

TELESCOPIC LIMITING STRUCTURE, CAMERA BODY AND CAMERA

CROSS-REFERENCE TO RELATED APPLICATION

This application is a continuation of application Ser. No. 15/991,663, filed on May 29, 2018, which is a continuation application of application Ser. No. 15/485,416, filed on Apr. 12, 2017, now U.S. Pat. No. 9,995,992, which is a continuation application of International Application No. PCT/CN2014/089215, filed on Oct. 22, 2014, the entire contents of all of which are incorporated herein by reference.

TECHNICAL FIELD

The present disclosure relates to a telescopic limiting structure, and relates to a camera body and a camera having the telescopic limiting structure.

BACKGROUND OF THE DISCLOSURE

A single lens camera comprises a lens and a camera body. The lens and the camera body are detachable and replaceable. In order to prevent the detachable lens from falling off and inaccurate positioning of electric circuit contacts, it is necessary to design a telescopic limiting structure that can extend and retract. A traditional solution of the telescopic limiting structure is to rotatably mount a lens on a camera assembling ring, use the assembling ring to hook the lens, and then insert a movable boss in the lens-release limiting structure into a lens groove, so as to achieve the purpose of preventing the lens from falling off due to free rotation in use.

However, the pressing method for a traditional lens-release press key block is performed along the axial direction of the lens, which should be no problem for ordinary cameras but is just neither convenient nor user-friendly, and is especially inconvenient for detaching the lens when the camera is applied to a mobile platform.

SUMMARY OF THE DISCLOSURE

The main technical problem to be solved by the embodiments of the present disclosure is to provide a telescopic limiting structure that can prevent an object to be limited from rotating and deviating and eventually falling off, while optimizing the detachment and attachment of the object, such as facilitating mounting and dismounting of a lens.

Another main technical problem to be solved by the embodiments of the present disclosure is to provide a camera body having the telescopic limiting structure that can prevent a lens from rotating and deviating and eventually falling off, while facilitating detachment and attachment of the lens.

Another main technical problem to be solved by the embodiments of the present disclosure is to provide a camera having the telescopic limiting structure and comprising a lens and a camera body.

In one aspect, the embodiments of the present disclosure provide a telescopic limiting structure, comprising:

a first-direction retractable member, wherein the first-direction retractable member is provided with a first inclined face; and a second-direction retractable member, wherein the second-direction retractable member is provided with a second inclined face, the first inclined face bears against the second inclined face so as to drive the second-direction retractable member to extend or retract along a second direction when the first-direction retractable member extends or retracts along a first direction, and a limiting structure is formed when the second-direction retractable member extends.

Furthermore, the first direction is substantially perpendicular to the second direction.

Furthermore, the first-direction retractable member comprises a press key and a first elastic element. The second-direction retractable member comprises a limiting boss and a second elastic element. The first elastic element is arranged between the press key and the limiting boss along the first direction, and the second elastic element is arranged along the second direction and is connected to the limiting boss.

Furthermore, the limiting boss comprises a bracket and a post and a shaft protruding from the bracket. The post forms the limiting structure, and the second elastic element is sheathed on the shaft.

Furthermore, the bracket is in a bent shape and comprises a first supporting part and a second supporting part. The post and the shaft extend perpendicularly from two opposite surfaces of the first supporting part, and the post and the shaft are parallel to the second supporting part, and the first elastic element is arranged between the press key and the second supporting part along the first direction.

Furthermore, two sides of a section of the second supporting part are inwardly provided with a limiting part respectively. Each of the limiting parts is provided with an upper boss and a lower boss arranged oppositely. The two limiting parts have a common intermediate supporting part. The second inclined faces are respectively provided at surfaces of the two lower bosses. The press key comprises a press key block and two snapping parts extending from the press key block. The first elastic element is arranged between the press key block and the intermediate supporting part along the first direction, and the first inclined faces are respectively formed at the two snapping parts.

Furthermore, a press key bracket is further included, wherein the press key bracket comprises a body and two claws extending from the body, each one of the snapping parts is provided with a protruding block facing away from the other one of the snapping parts, the protruding block is provided with a snapping face facing towards the press key block, and the claw snaps with the snapping face so as to restrict the release of the press key from the press key bracket when the press key extends or retracts along the first direction.

In another aspect, the embodiments of the present disclosure provide a camera body comprising a fixing frame, wherein the fixing frame is provided with a lens assembling opening for assembling a lens, and the fixing frame is further provided with a telescopic limiting structure, wherein the telescopic limiting structure comprises:

a first-direction retractable member, wherein an outer side wall of the fixing frame is inwardly provided with a first assembling hole, the first-direction retractable member extends into the fixing frame from the first assembling hole, and the first-direction retractable member is provided with a first inclined face; and a second-direction retractable member, wherein the fixing frame is inwardly provided with a second assembling hole at an end of the lens assembling opening, the second-direction retractable member extends into the fixing frame from the second assembling hole, the second-direction retractable member is provided with a second inclined face, the first inclined face bears against the second inclined face so as to drive the second-direction retractable member to extend or retract along a second direction when the first-direction retractable member extends or retracts along a first direction, and a limiting structure for restricting the lens is formed when the second-direction retractable member extends.

Furthermore, the inner wall of the lens assembling opening is provided with a lens assembling ring, and the inner wall of the lens assembling ring is provided with a rib for overlapping and snapping with a flange on the outer side of the lens.

In yet another aspect, the embodiments of the present disclosure provide a camera comprising the camera body as mentioned above and a lens detachably connected to the camera body, wherein the lens is detachably connected to the camera body at the lens assembling opening of the fixing frame, and is telescopically limited by the telescopic limiting structure.

The lens is provided with a lens cone. The lens cone is provided with a protruding assembling part. The outer side wall of the assembling part is provided with a flange. The lens assembling opening is provided with a lens assembling ring. The inner wall of the lens assembling ring is provided with a rib, and the flange overlaps and snaps with the rib via rotation after the lens is assembled into the lens assembling ring.

One end of the lens cone is also inwardly provided with a hole. The limiting structure is provided with a post, and the post is used for protruding into the hole for limiting.

The first-direction retractable member of the telescopic limiting structure in the embodiments of the present disclosure drives the second-direction retractable member to move via inclined face fitting. For example, when the camera is held by one hand in the second direction of the camera, the lens can be easily and steadily pressed by a finger, and the retractable member can be released by the other hand in the first direction, avoiding interference of operations in the same direction. The camera body and the camera in the embodiments of the present disclosure can prevent the lens from rotating and deviating and eventually falling off, while facilitating detachment and attachment of the lens and smoother usage thereof.

DESCRIPTION OF REFERENCE SIGNS OF MAIN ELEMENTS

TABLE 1

| | |
|---|---|
| Telescopic limiting structure | 100 |
| Press key | 10 |
| Press key bracket | 20 |
| Limiting boss | 30 |

TABLE 1-continued

| | |
|---|---|
| First elastic element | 40 |
| Second elastic element | 50 |
| Press key block | 12 |
| Snapping part | 14 |
| End face | 121 |
| First inclined face | 142 |
| Upper surface | 143 |
| Protruding block | 144 |
| Snapping face | 145 |
| Body | 21 |
| Claw | 22 |
| Post | 31 |
| Bracket | 32 |
| Shaft | 33 |
| First supporting part | 321 |
| Second supporting part | 322 |
| Limiting part | 323 |
| Intermediate supporting part | 323a |
| Upper boss | 323b |
| Lower boss | 323c |
| Second inclined face | 323f |
| Camera body | 200 |
| Fixing frame | 210 |
| Lens assembling ring | 230 |
| Locating hole | 230a |
| Rib | 232 |
| Sliding groove | 234 |
| First assembling hole | 214 |
| Second assembling hole | 212 |
| Post body | 216 |
| Stepped face | 217 |
| Guiding hole | 218 |
| Camera | 300 |
| Lens | 350 |
| Lens cone | 370 |
| Flange | 372 |
| Assembling part | 374 |
| Hole | 376 |

Exemplary embodiments will be described below in connection with the above-mentioned drawings.

DETAILED DESCRIPTION OF THE EMBODIMENTS

The technical solutions in the embodiments of the present disclosure are hereinafter described with reference to the accompanying drawings. The described embodiments are only some rather than all of the embodiments of the present disclosure. All other embodiments obtained by a person of ordinary skill in the art based on the embodiments of the present disclosure without creative efforts shall fall within the scope of protection of the present disclosure.

A telescopic limiting structure provided in the embodiments of the present disclosure can be mounted into an object and fitted with another object, so as to prevent the rotation and detaching of the another object. The objects can be but are not limited to the camera body and the lens of a camera. For example, the telescopic limiting structure can be used for mounting into the camera body and fitting with the lens, which can prevent the lens from rotating and eventually falling off and can facilitate detachment and attachment of the lens. The camera can be an ordinary camera with a detachable lens, a single lens camera with relatively good imaging quality, or a camera for special use, such as an aerial camera used on an unmanned aerial vehicle.

Figure 1:
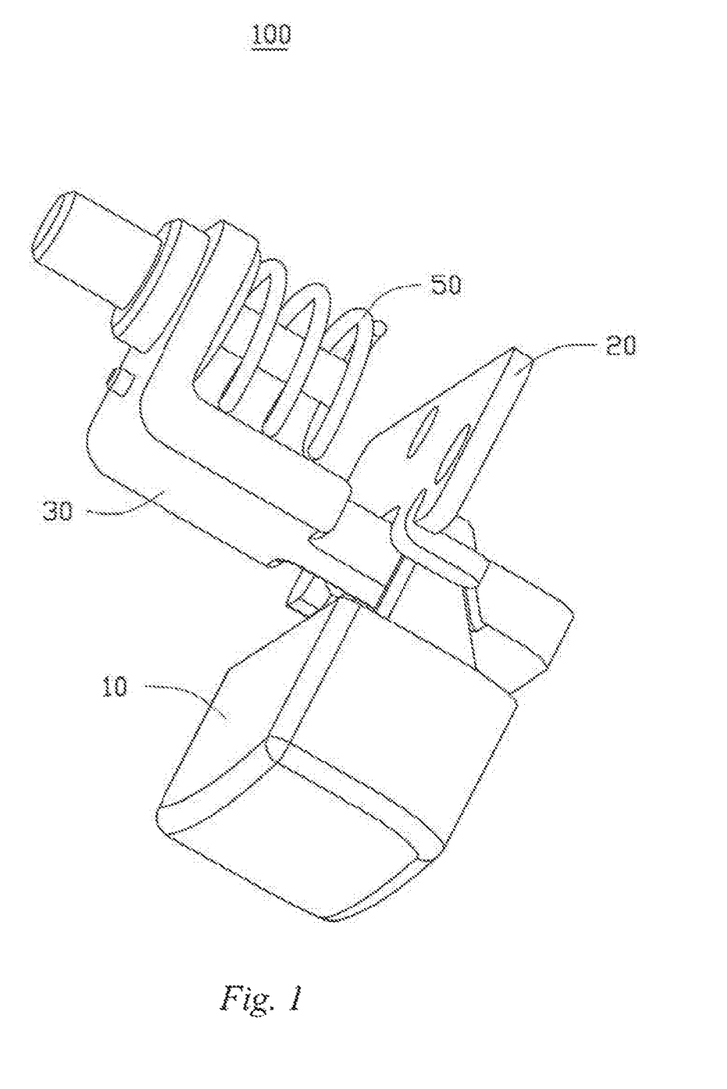
FIG. 1 is a schematic perspective view of a telescopic limiting structure provided in the embodiments of the present disclosure.
Figure 2:
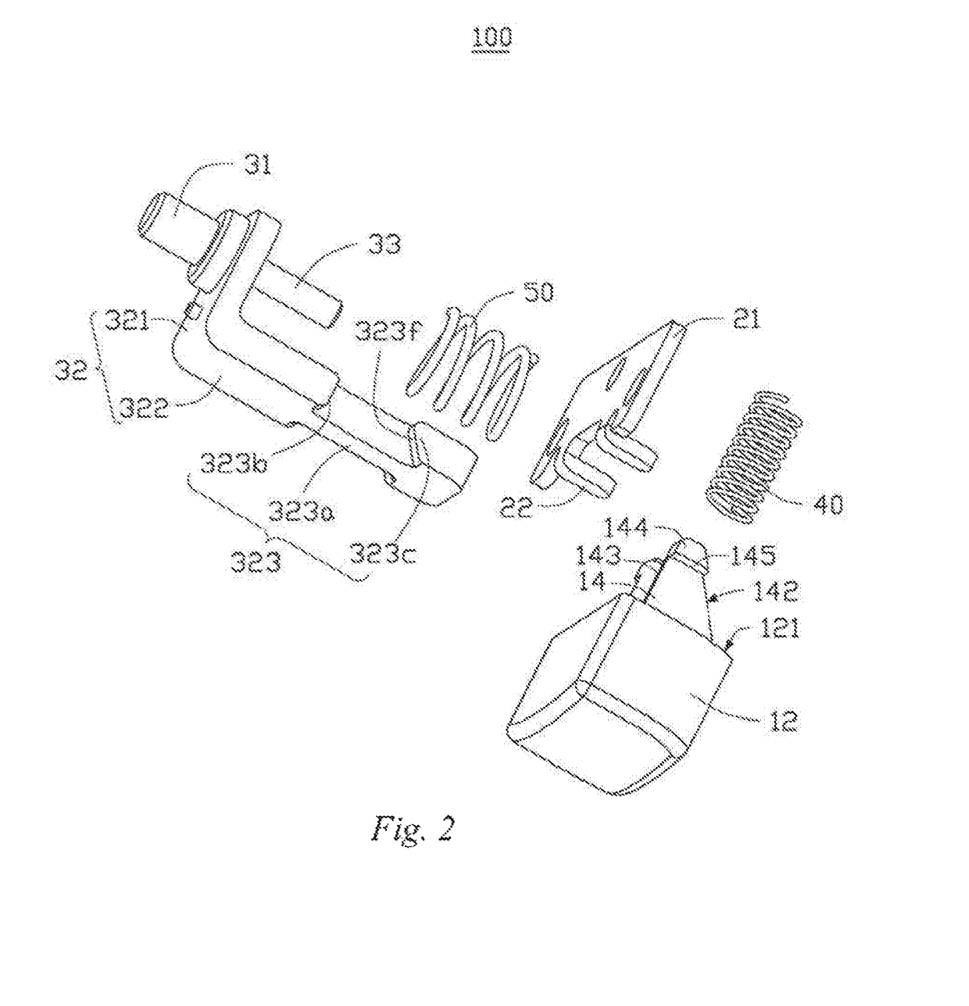
FIG. 2 is a schematic exploded view of the telescopic limiting structure as shown in FIG. 1.

Specifically, with reference to FIG. 1 and FIG. 2, a telescopic limiting structure 100 comprises a press key 10, a press key bracket 20, a limiting boss 30, a first elastic element 40, and a second elastic element 50. A camera body is taken as the object to which the telescopic limiting structure 100 is mounted and a lens is taken as the object to be limited for specific illustration of the various components and the usage thereof.

The press key 10 is movably disposed on a side edge of the camera body. The press key 10 comprises a press key block 12 and two snapping parts 14 extending from the press key block 12. The two snapping parts 14 extend from a same end face 121 of the press key block 12, and a spacing is provided therebetween. Each of the snapping parts 14 is provided with a first inclined face 142, and in the present embodiment, the first inclined face 142 inclines from the end face 121 of the press key block 12 in the direction away from the end face 121. That is, the width of each of the snapping parts 14 in the direction parallel to the end face 121 gradually decreases from the end face 121 in the direction away from the end face 121. In the present embodiment, each of the snapping parts 14 is a right-angled triangle. The snapping part 14 comprises an upper surface 143 opposite the first inclined face 142, and the upper surface 143 is a planar surface. The end part of each of the snapping parts 14 is provided with a protruding block 144. The protruding block 144 is located on a side face of the snapping part 14 facing away from the other snapping part 14 and is arranged at an end of the snapping part 14 away from the end face 121, and the protruding block 144 is provided with a snapping face 145 facing toward the end face 121. In the present embodiment, the snapping face 145 is a planar surface.

The press key bracket 20 is used for fixing in the camera body, and has the function of snapping with the press key 10 so as to prevent the press key 10 from being released from the camera body. The press key bracket 20 has a body 21 and two claws 22 extending from the body 21, and the two claws 22 have a spacing therebetween and are substantially perpendicular to the main surface of the body 21. Each claw 22 is used to snap with the snapping face 145 of the press key 10.

The limiting boss 30 is movably disposed in the camera body of the camera, and has a post 31 that protrudes from the end face of the camera body facing towards the lens of the camera and that is embedded into the lens cone of the lens. The limiting boss 30 further comprises a bracket 32 and a shaft 33. The bracket 32 is in a bent shape, and has a first supporting part 321 and a second supporting part 322 arranged substantially perpendicularly. A post 31 perpendicularly extends from one side of the first supporting part 321, a shaft 33 perpendicularly extends from the other side thereof, and the post 31 and the shaft 33 are parallel to the second supporting part 322. The second supporting part 322 is inwardly cut out respectively on two sides of an approximately middle position, and limiting parts 323 are formed on the two sides. The limiting parts 323 on the two sides are provided with an intermediate supporting part 323a connecting two ends of the second supporting part 322, and due to the cut-outs, each limiting part 323 forms an upper boss 323b and a lower boss 323c protruding relative to the intermediate supporting part 323a. The lower boss 323c is provided with a second inclined face 323f.

The first elastic element 40 is arranged between two snapping parts 14 of the press key 10 and abuts between the end face 121 and the intermediate supporting part 323a, and the intermediate supporting part 323a of the limiting boss 30 is accommodated between the two snapping parts 14. The beveled first inclined faces 142 of the two snapping parts 14 abut against the second inclined faces 323f of the lower boss 323c of the limiting boss 30. The claws 22 of the press key bracket 20 snap with the snapping faces 145 of the press key 10. The second elastic element 50 is sheathed on the shaft 33 of the limiting boss 30 One end of the second elastic element 50 abuts against one side of the first supporting part 321, and the other end is used to abut against an inner wall of a hole formed in the camera body. When a user presses the press key 10, a force acting along the beveled first inclined face 142 can be resolved into a propelling force perpendicular to the end face 121 of the press key 10 and a downward force pressing the second inclined face 323f downwards. The downward force enables the limiting boss 30 to move towards the direction of compressing the second elastic element 50, so that the post 31 can be released from the lens; and when the user no longer presses the press key 10, due to the action of the first elastic element 40 and the second elastic element 50, the press key 10 and the limiting boss 30 will automatically rebound, and the post 31 protrudes and is snapped into the lens to prevent the lens from rotating and eventually falling off. The claws 22 of the press key bracket 20 can prevent the press key 10 from being released from the camera body of the camera when the press key rebounds.

Figure 3:
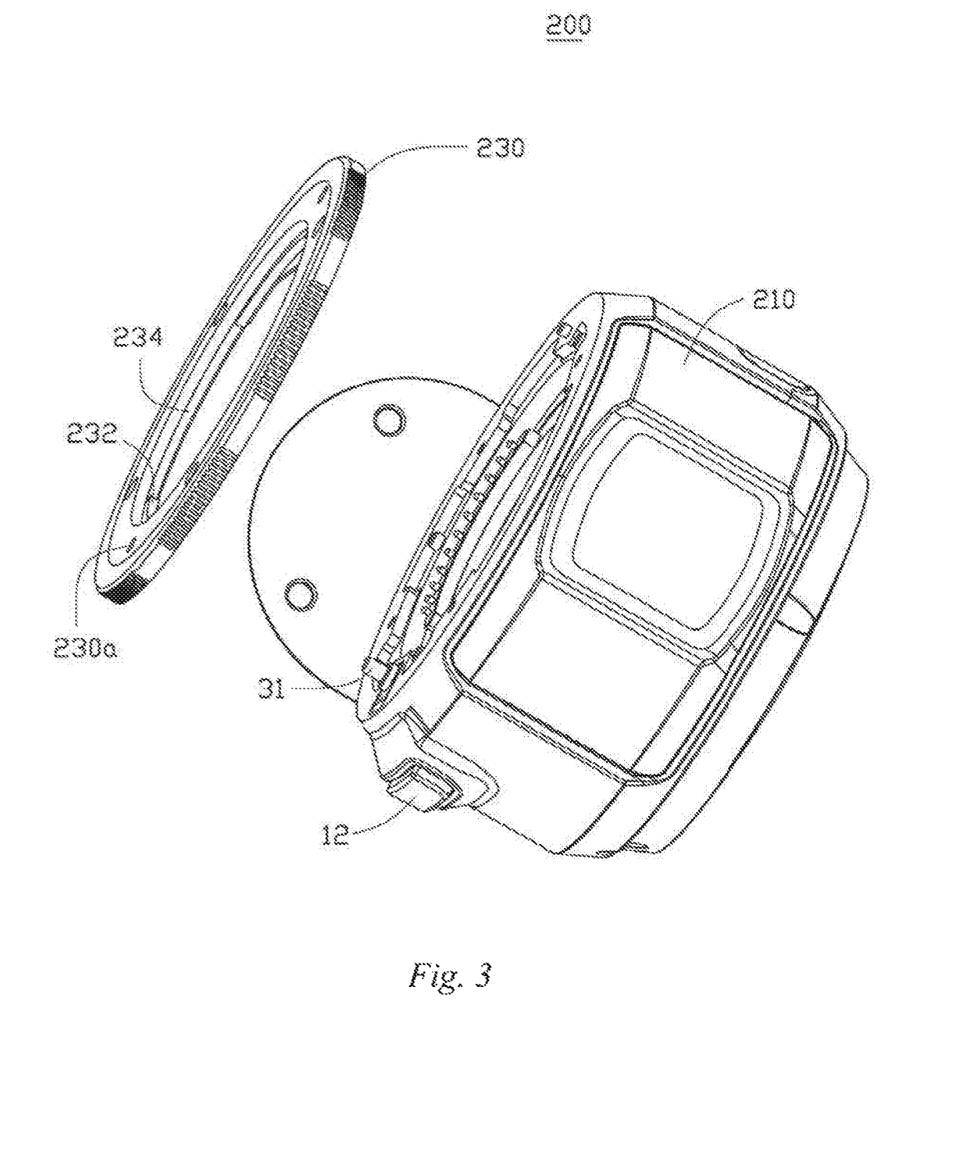
FIG. 3 is a schematic, partially exploded and perspective view of a camera body provided in the embodiments of the present disclosure.
Figure 4:
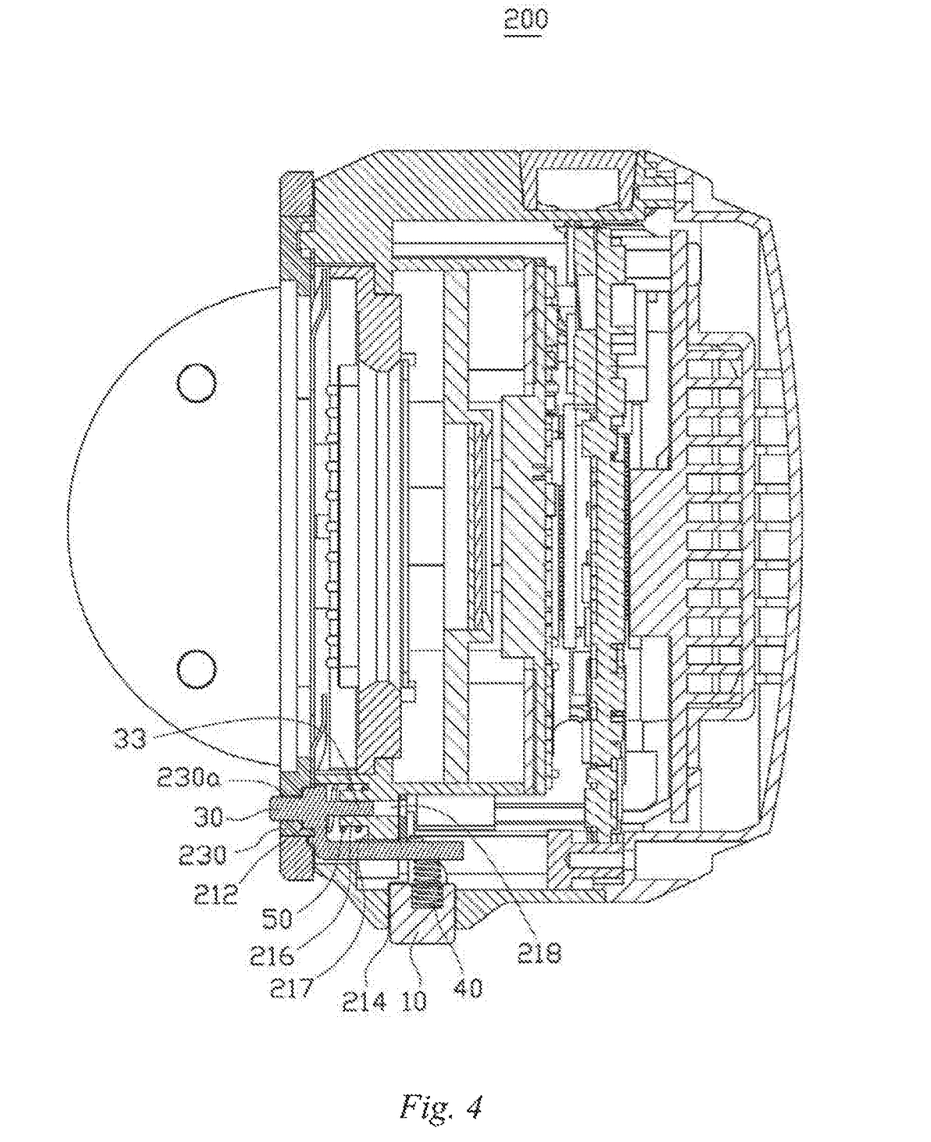
FIG. 4 is a sectional view of the camera body as shown in FIG. 3.

With reference to FIG. 3 and FIG. 4 at the same time, a camera body 200 of a camera provided in the embodiments of the present disclosure has a fixing frame 210, an assembly such as a circuit board is arranged in the fixing frame 210, and the fixing frame 210 is further provided with a telescopic limiting structure 100 and a lens assembling ring 230.

The fixing frame 210 is inwardly provided with a first assembling hole 214 on an outer side wall thereof; the end for assembling the lens is inwardly provided with a second assembling hole 212; and the press key 10, the first elastic element 40, and the press key bracket 20 of the telescopic limiting structure 100 are assembled into the first assembling hole 214. The limiting boss 30 and the second elastic element 50 of the telescopic limiting structure 100 are assembled into the second assembling hole 212. The first assembling hole 214 is in communication with the interior of the second assembling hole 212 so as to assemble the limiting boss 30, the press key 10, and the first elastic element 40 together.

Specifically, the camera body 200 has a post body 216 in the interior of the second assembling hole 212. Stepped faces 217 are formed on two sides of the post body 216, and a guiding hole 218 is formed at the center of the post body 216. The shaft 33 is inserted into the guiding hole 218, and the end part of the second elastic element 50 abuts against the stepped faces 217 on two sides of the post body 216. The guiding hole 218 is fitted with the shaft 33 so as to prevent the limiting boss 30 from inclining during movement.

The lens assembling ring 230 is arranged at the end of the fixing frame 210 for assembling the lens. The post 31 of the limiting boss 30 passes through a locating hole 230a of the lens assembling ring 230 and protrudes outwards relative to the lens assembling ring 230. A sliding groove 234 and a rib 232 are arranged on an inner side of the lens assembling ring 230 and used for rotating after the lens is screwed into the sliding groove 234 so that the rib 232 overlaps and snaps with the flange on the lens cone, realizing the function of preventing the lens from falling off in the axial direction. At the same time, the post 31 of the telescopic limiting structure 100 is embedded into the hole at the end part of the lens cone so as to prevent the rotation of the lens, thereby preventing the lens from eventually being released from the lens assembling ring 230 in the axial direction.

It can be understood that, if a structure for preventing the press key 10 from falling off the camera body is provided in the camera body, the press key bracket 20 is not required. The press key and the first elastic element constitute a first-direction retractable member, and the limiting boss and the second elastic element constitute a second-direction retractable member. In the present embodiment, the first direction is substantially perpendicular to the second direction. The first direction is a radial direction parallel to the camera body, and the second direction is an axial direction parallel to the camera body. However, in other embodiments, the first direction and the second direction can be determined according to requirements and may not be necessarily perpendicular to each other.

Figure 5:
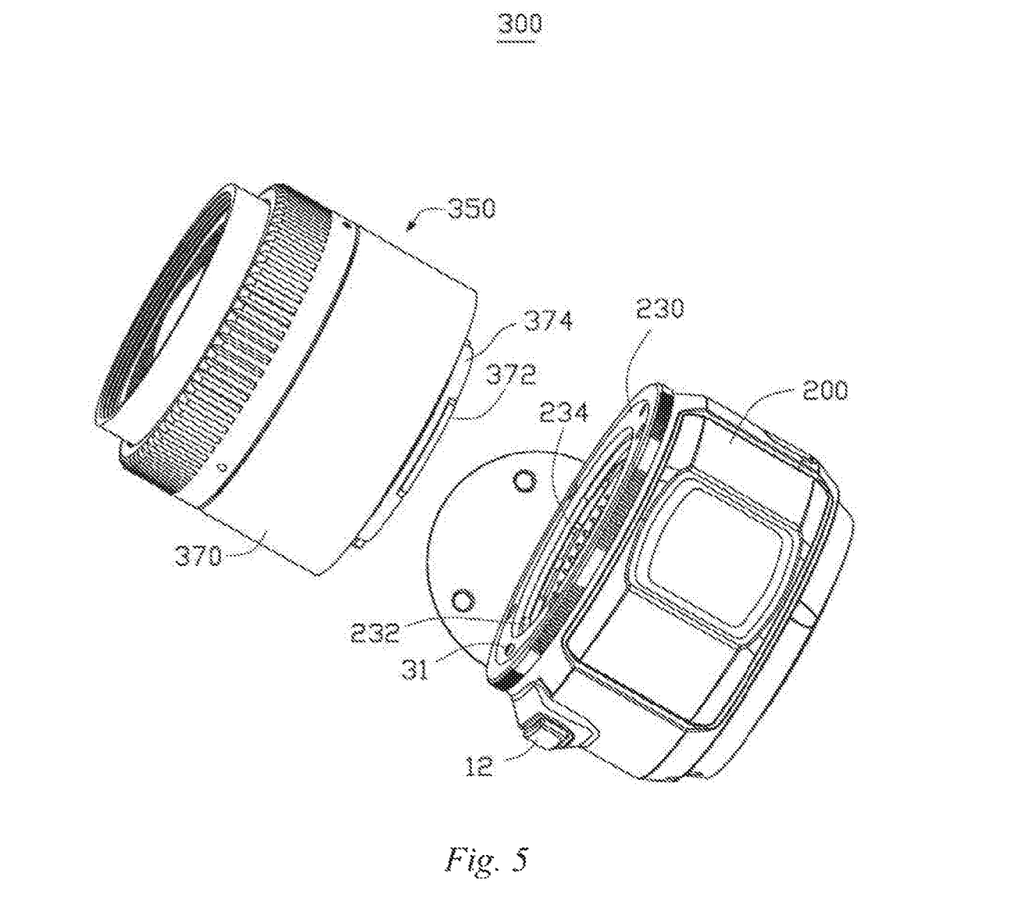
FIG. 5 is a schematic perspective view of the separation of a lens and the camera body provided in the embodiments of the present disclosure.
Figure 6:
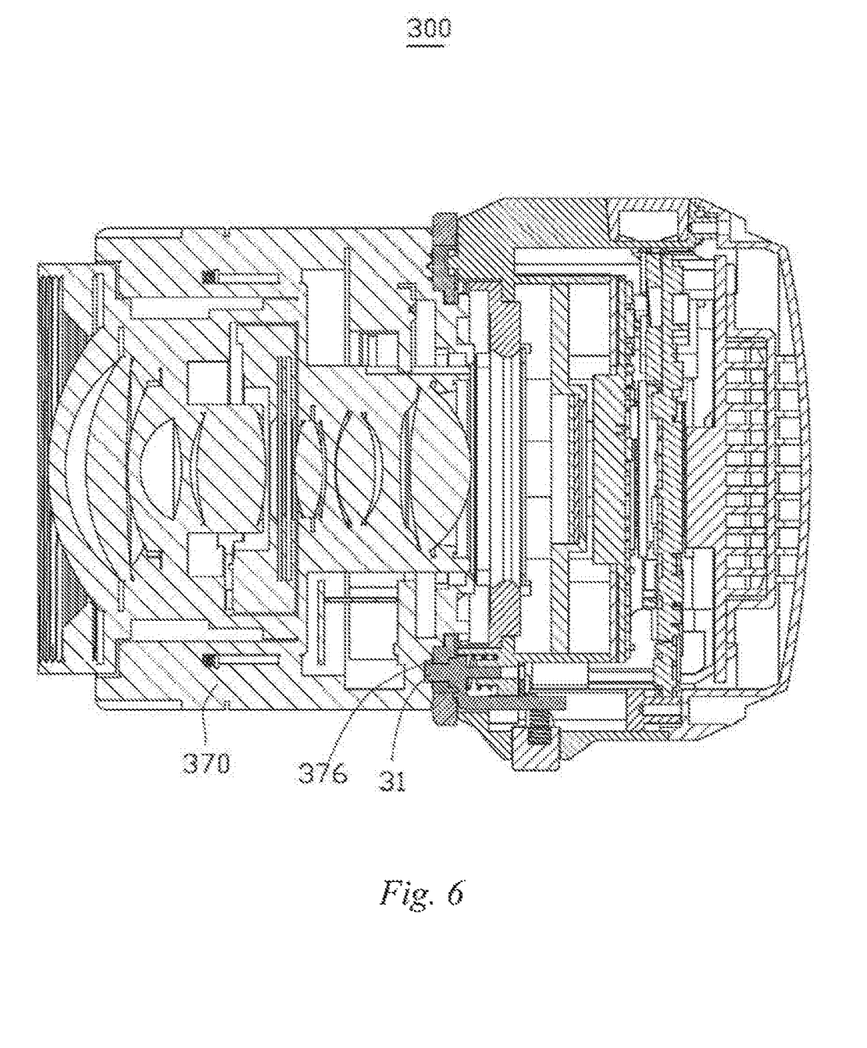
FIG. 6 is a sectional view of the lens and the camera body as shown in FIG. 5 after assembly.

With reference to FIG. 5 and FIG. 6, the embodiments of the present disclosure provide a camera 300 comprising a camera body 200 and a lens 350. A lens cone 370 of the lens 350 is provided with an assembling part 374. The outer side wall of the assembling part 374 is provided with a flange 372, and the flange 372 is used to overlap and snap with the rib 232 of the lens assembling ring 230 so as to realize the function of preventing the lens from falling off in the axial direction. One end of the lens cone 370 is further inwardly provided with a hole 376 for fitting with the post 31 of the telescopic limiting structure 100, so that the lens can be prevented from rotating and thereby from eventually being released from the lens assembling ring 230 in an axial direction.

When it is desired to detach the lens, the press key 10 on the side face is pressed. The pressing forces the limiting boss 30 to move towards the fixing frame 210 so as to be released from the hole 376 of the lens, while the lens 350 can be held to rotate relative to the camera body 200 so as to be released from the lens assembling ring 230, thereby separating the lens 350 from the camera body.

In summary, the first-direction retractable member of the telescopic limiting structure in the embodiments of the present disclosure drives the second-direction retractable member to move via inclined face fitting. For example, when the camera is held by one hand in the second direction of the camera, the lens can be easily and steadily pressed by a finger, and the retractable member can be released by the other hand in the first direction, avoiding interference of operations in the same direction. The camera body and the camera in the embodiments of the present disclosure can prevent the lens from falling off and deviation after the lens is rotated, while facilitating detachment and attachment of the lens and smoother usage thereof.

The description above only relates to the embodiments of the present disclosure and is not intended to limit the scope of the present disclosure, and any transformation with equivalent structures or equivalent procedures made using the contents of the specification and accompanying drawings of the present disclosure or applied in other relevant technical fields directly or indirectly should likewise be encompassed in the scope of the present disclosure.

What is claimed is:

1. A telescopic limiting structure comprising:
a first retractable member including a first inclined face, the first retractable member being configured to move along a first direction; and
a second retractable member including a second inclined face bearing against the first inclined face, the first inclined face and the second inclined face being configured to drive the second retractable member to move along a second direction in response to the first retractable member moving along the first direction, and the second direction being different from the first direction, wherein the first retractable member includes a first elastic element configured to extend and retract along the first direction, the second retractable member includes a second elastic element configured to extend and retract along the second direction, and in a process of compressing the first elastic element, the second elastic element moves closer to the first retractable member in the second direction.

2. The telescopic limiting structure of claim 1, wherein the first direction is substantially perpendicular to the second direction.

3. The telescopic limiting structure of claim 1, wherein:
the first retractable member comprises a press key; and
when the press key is pressed, the first elastic element is compressed along the first direction and the second elastic element is compressed along the second direction.

4. The telescopic limiting structure of claim 3, wherein:
the second retractable member comprises a limiting boss, the limiting boss including a bracket having a bent shape;
the bracket includes a first supporting part and a second supporting part; and
the second inclined face is provided at the second supporting part.

5. The telescopic limiting structure of claim 4, wherein:
the first elastic element is arranged between the second supporting part and the press key along the first direction; and
the second elastic element is connected to the limiting boss and is arranged between the first supporting part and the first retractable member.

6. The telescopic limiting structure of claim 5, wherein the press key comprises a press key block and two snapping parts extending from an end face of the press key block.

7. The telescopic limiting structure of claim 6, wherein:
the first elastic element is arranged between the end surface of the press key block and the second supporting part, and accommodated between the two snapping parts.

8. The telescopic limiting structure of claim 6, wherein each of the snapping parts comprises a protruding block having a snapping face facing towards the end face of the press key block.

9. The telescopic limiting structure of claim 8, wherein the protruding block of one of the snapping parts is arranged at an end of the one of the snapping parts that is distal from the end face of the press key block and on a side face of the one of the snapping part that faces away from another one of the snapping parts.

10. The telescopic limiting structure of claim 9, wherein:
the first retractable member further includes a press key bracket configured to snap with the snapping faces of the snapping parts; and
the second elastic element is arranged between the press key bracket and the first supporting part.

11. A camera body comprising:
a fixing frame; and
a telescopic limiting structure coupled to the fixing frame, the telescopic limiting structure comprising:
a first retractable member extending into the fixing frame, the first retractable member including a first inclined face and being configured to move along a first direction; and
a second retractable member extending into the fixing frame, the second retractable member including a second inclined face bearing against the first inclined face, the first inclined face and the second inclined face being configured to drive the second retractable member to move along a second direction in response to the first retractable member moving along the first direction, and the second direction being different from the first direction, wherein the first retractable member includes a first elastic element configured to extend and retract along the first direction, the second retractable member includes a second elastic element configured to extend and retract along the second direction, and in a process of compressing the first elastic element, the second elastic element moves closer to the first retractable member in the second direction.

12. The camera body of claim 11, wherein:
the first retractable member comprises a press key; and
when the press key is pressed, the first elastic element is compressed along the first direction and the second elastic element is compressed along the second direction.

13. The camera body of claim 12, wherein:
the second retractable member comprises a limiting boss, the limiting boss including a bracket having a bent shape;
the bracket includes a first supporting part and a second supporting part; and
the second inclined face is provided at the second supporting part.

14. The camera body of claim 13, wherein:
the first elastic element is arranged between the second supporting part and the press key along the first direction; and
the second elastic element is connected to the limiting boss and is arranged between the first supporting part and the first retractable member.

15. The camera body of claim 14, wherein the press key comprises a press key block and two snapping parts extending from an end face of the press key block.

16. The camera body of claim 15, wherein:
the first elastic element is arranged between the end surface of the press key block and the second supporting part, and accommodated between the two snapping parts.

17. The camera body of claim 11, wherein:
the fixing frame further comprises:
a lens assembling opening provided on an end wall of the fixing frame and for assembling a lens;
a first assembling hole provided on an outer side wall of the fixing frame; and
a second assembling hole provided on the end wall;

the first retractable member extends into the fixing frame through the first assembling hole; and
the second retractable member extends into the fixing frame through the second assembling hole.

18. The camera body of claim 11, wherein:
the fixing frame further comprises a lens assembling ring provided on an inner wall of the lens assembling opening; and
the lens assembling ring comprises a rib provided on an inner wall of the lens assembling ring.

19. A camera comprising:
a camera body comprising:
a fixing frame; and
a telescopic limiting structure coupled to the fixing frame, the telescopic limiting structure comprising:
a first retractable member extending into the fixing frame, the first retractable member including a first inclined face and being configured to move along a first direction; and
a second retractable member extending into the fixing frame, the second retractable member including a second inclined face bearing against the first inclined face, the first inclined face and the second inclined face being configured to drive the second retractable member to move along a second direction in response to the first retractable member moving along the first direction, and the second direction being different from the first direction,
wherein the first retractable member includes a first elastic element configured to extend and retract along the first direction, the second retractable member includes a second elastic element configured to extend and retract along the second direction, and in a process of compressing the first elastic element, the second elastic element moves closer to the first retractable member in the second direction; and
a lens detachably coupled to the camera body, a movement of the lens being limited by the telescopic limiting structure.

20. The camera of claim 19, wherein:
the first retractable member comprises a press key; and
when the press key is pressed, the first elastic element is compressed along the first direction and the second elastic element is compressed along the second direction.

* * * * *